April 12, 1932. G. D. MALLORY 1,853,827
PNEUMATIC TIRE
Filed Feb. 18, 1930
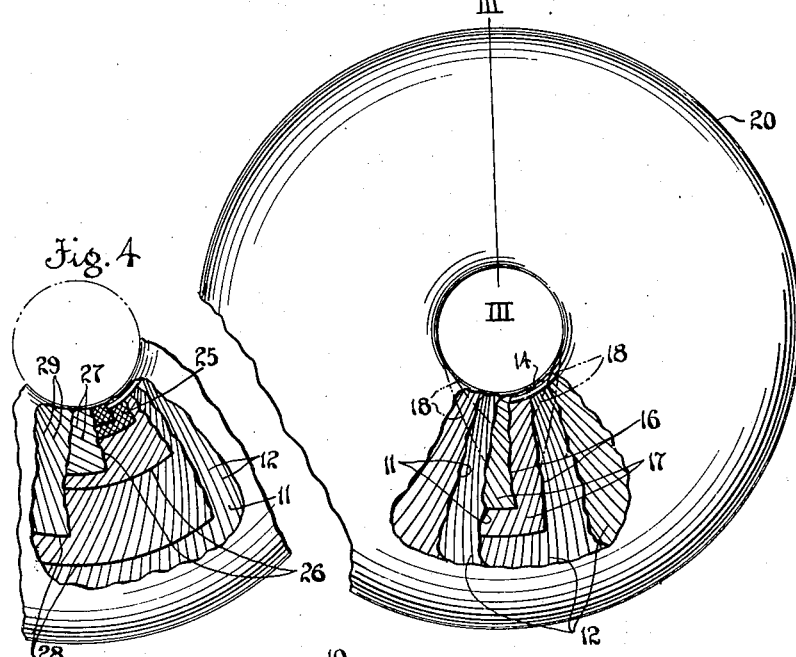
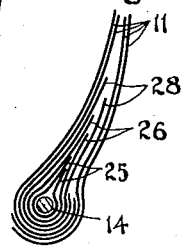
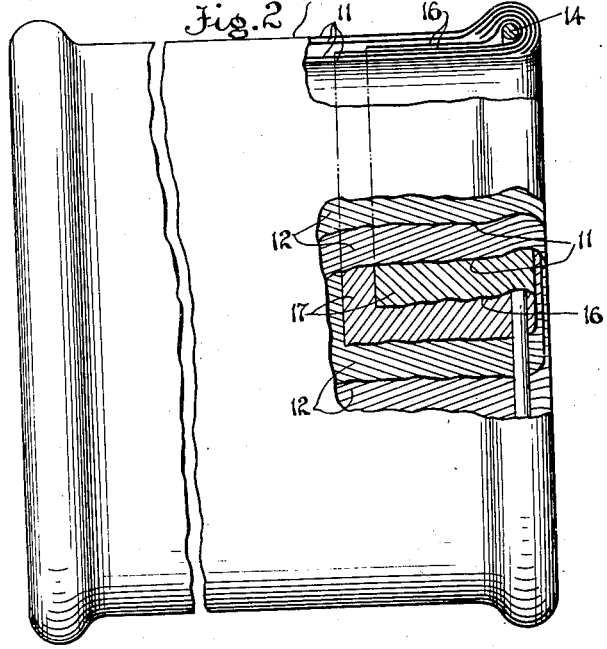
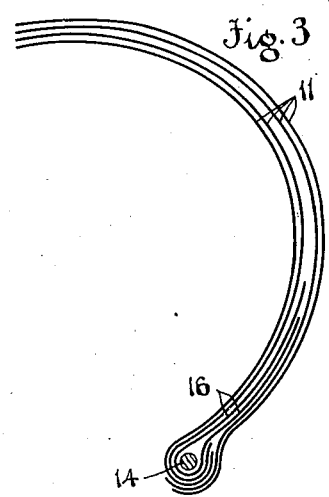
Inventor
Gerald D. Mallory Patented Apr. 12, 1932

1,853,827

UNITED STATES PATENT OFFICE

GERALD D. MALLORY, OF AKRON, OHIO, ASSIGNOR TO THE GOODYEAR TIRE & RUBBER COMPANY, OF AKRON, OHIO, A CORPORATION OF OHIO

PNEUMATIC TIRE

Application filed February 18, 1930. Serial No. 429,360.

This invention relates to pneumatic tires and it has particular relation to a type of tire which has a sufficiently small inner diameter to be mounted directly upon a supporting hub.

One object of the invention is to provide reinforcing material in a tire casing which will properly distribute forces in the tire to prolong the wearing qualities of the tire side walls and insure strong unions between the tire side walls and the tire beads.

Another object of the invention is to provide flipper strips which will transmit forces from the ply cords adjacent the bead portions of the tire to the cords of the flipper strips which absorb such forces in a direction substantially tangential with respect to the beads of the tire.

In the type of tires wherein relatively small bead rings are employed, such as those designed to be mounted directly upon hub barrels, there has been a tendency toward failure about the beads and the tire side walls adjacent the bead portions of the tire. This condition is believed to be a result of the fact that the cords of the tire carcass are directed substantially toward the center of a tire or bead rings. Cords disposed in this relation to the center of the tire do not adequately withstand torsional forces because of the relatively small diameter of the beads as compared with the maximum diameter of the tire. In building tires of this kind, it is necessary that the cords of the radial plies be disposed substantially in the radial relation mentioned in order that the proper directional relation of the cords may be effected throughout the other portions of the tire.

Conventional square woven flipper strips having skirts sufficiently wide to extend along and reinforce the tire side walls installed according to known practice, are not practical in this type of tire because they are not adapted to withstand torsional forces therein, and they are not adapted to be sufficiently distorted to be shaped according to the contour of the tire fabric adjacent the beads. If an attempt were made to install the square woven flipper strips, they would be greatly distorted and injured unless they were relatively narrow. By employing relatively wide straight woven cord flipper strips about the beads, the cords can be arranged in such manner as to be directed substantially tangentially of the bead rings and accordingly, they will be in proper position to absorb the forces imposed in this direction from the body of the tire to the beads. The term "straight woven cords" is intended to define cords which are substantially without weft threads or are provided with small frangible weft threads which serve only to maintain the cords in proper relation until they are calendered or coated with rubber, but do not serve to add strength to the material.

For a better understanding of the invention, reference may now be had to the accompanying drawings forming a part of this specification, of which Figure 1 is an elevational view of a tire embodying the invention;

Figure 2 is a fragmentary view of a tire band having the invention incorporated therein;

Figure 3 is a cross-sectional view taken substantially along the lines III—III of Figure 1;

Figure 4 is a fragmentary view of a tire having a novel combination of flipper strips incorporated therein; and Figure 5 is a diagrammatical, cross-sectional view of a bead portion of a tire built according to Figure 4.

In practicing the invention, a cylindrical or endless band 10 is built of cord fabric plies 11 having their cords 12 disposed diagonally from one bead 13 of the band to the other bead 14. After the band has been shaped into the form shown by Figure 3, the cords 12 extend substantially radially of the tire, i. e., approximately toward the center or major axis of the bead rings at the locations of intersection with the latter.

A flipper strip 16 composed of straight woven cords 17 is folded about each of the bead rings 13 and 14. After the band is shaped, the ends of the cords 17, extending away from the beads, separate in fan-like relation. It will be observed that the cords of the flipper strips are so arranged that they extend, after shaping, substantially tangentially of the bead rings, as indicated by the broken lines 18 of Fig. 1. At least, in extending toward the circumference of each bead ring, the cords are directed toward points materially spaced from the center of the bead rings. Thus the cords 17 of the flipper strip will cross the cords 12 of the plies of the tire carcass at different angles from the crossing of the cords of the respective plies or the crossing of the contiguous cords of the folded flipper strip. Accordingly, the torsional or tangential forces transmitted from the side walls of a completed tire 20 are transmitted from the relatively radially disposed cords 12 to the relatively tangential cords 17 of the flipper strip. In other words, the cords of the flipper strip are so disposed that the torsional forces of the band will be directed substantially longitudinally of the cords 17, whereas such forces would otherwise impose excessive stresses upon the cords 12. These forces would otherwise tend to spread the cords 12 of plies in a direction in which cords are not adapted to receive them, and cause premature failure of the tire.

In the form of the invention shown by Figs. 4 and 5, the plies 11, cords 12, and bead rings 13 and 14 are arranged in the same manner as the corresponding elements of Fig. 1. However, a relatively narrow cross-woven flipper strip 25 is folded about the beads. Then a wider straight-woven cord flipper strip 26 is applied about the bead with its cords 27 in practically the same relation as the cords of the flipper strip 16. An additional flipper strip 28 having its cords 29 running at a different angle to the bead ring from the corresponding angle of the cords 27, is disposed about the flipper strip 26, but its edge portions extend considerably farther along the side walls of the tire toward the tread than the edge portions of the flipper strip 26. From this construction it will be apparent that the forces in the side walls of the tire during its use, are transmitted through a plurality of layers of cords to the bead rings and that the angles of the cords of the several plies and flipper strips, with respect to the bead rings, are different.

Although I have disclosed only the preferred forms which the invention may assume and have described those forms in detail, it will be apparent to those skilled in the art that the invention is not so limited but that various modifications may be made therein without departing from the spirit of the invention or from the scope of the following claims.

What I claim is:

1. A tire casing including beads, cord fabric extending about the beads, the cords of the fabric extending substantially radially of the tire at the bead portions thereof, and having a diagonal relation therewith at the tread portion of the tire, and a cord flipper strip disposed about each bead, the cords of the flipper strip being disposed at angles to the cords of the tire fabric.

2. A tire casing including beads, cord fabric extending to each bead of the tire, the cords of the fabric extending substantially toward the axis of the tire beads, in the area of the beads, the cords at the tread portion of the tire extending diagonally thereof, and a straight woven cord flipper strip folded about each bead, the cords of the flipper strip extending toward the circumference of the bead and toward points materially spaced from the center of the bead.

3. A tire casing including beads, cord fabric plies extending to each bead of the tire, the cords of the fabric extending substantially toward the center of the beads, in the area of the beads, the cords at the tread portion of the tire extending diagonally thereof, and a cord flipper strip looped about each bead and extending well up on the sidewalls of the carcass, the cords of the flipper strip extending toward the circumference of the bead and substantially tangential thereto at the intersection of each flipper strip cord with the circumference of the bead.

4. A tire casing comprising beads, cord fabric plies extending about each bead with the cords adjacent the beads directed substantially toward the axis of the bead, the cords at the tread portion of the tire extending diagonally thereof, a cross-woven flipper strip disposed about the bead and a plurality of straight woven flipper strips of materially different widths disposed about the cross-woven flipper strip, each cord flipper having its cords disposed at an angle to the beads materially different from corresponding angles of the cords of the other strip and the cords of the carcass plies.

5. A tire carcass having relatively large cross-sectional dimensions and relatively small bead diameters and having a body formed of a plurality of plies of alternately turned, bias cut cord fabric secured at their sides to inextensive beads, the cords of said plies extending substantially radially from the beads but extending over the tread and shoulder portions of the tire in diagonal relation with the beads, and flipper strips surrounding the beads of the tire and extending up the sidewalls of the tire carcass, the cords in the flipper strips extending substantially tangentially of the beads.

6. A tire casing having cross-sectional dimensions which are relatively large when compared with the bead diameters, said casing including beads, a plurality of plies of alternately turned, bias cut cord fabric secured to the beads and forming the carcass of the tire, the cords of said plies extending from one bead to the other and lying in curved paths, said cords being substantially radial of the beads adjacent thereto but curving to a substantially diagonal angle with respect thereto adjacent the shoulders and tread portion of the tire, and fabric members in the sidewalls and bead portions of the carcass and positioned to transmit the torsional forces from the beads to the tread and shoulder portions of the tire.

In witness whereof, I have hereunto signed my name.

Signed at Akron, in the county of Summit and State of Ohio, U. S. A., this 15th day of February, 1930.

GERALD D. MALLORY.